US007948938B2

(12) United States Patent  
Brown et al.

(10) Patent No.: US 7,948,938 B2
(45) Date of Patent: May 24, 2011

(54) WIRELESS COMMUNICATION DEVICE WITH DURESS PASSWORD PROTECTION AND RELATED METHOD

(75) Inventors: Michael S. Brown, Ontario (CA); Neil P. Adams, Ontario (CA); Herbert A. Little, Ontario (CA); Michael G. Kirkup, Ontario (CA); Michael K. Brown, Ontario (CA); Ian M. Robertson, Ontario (CA); Jonathan F. Hammell, Ontario (CA)

(73) Assignee: Research In Motion Limited, Waterloo, ON (CA)

( * ) Notice: Subject to any disclaimer, the term of this patent is extended or adjusted under 35 U.S.C. 154(b) by 541 days.

(21) Appl. No.: 10/835,260

(22) Filed: Apr. 30, 2004

(65) Prior Publication Data

US 2005/0245229 A1 Nov. 3, 2005

(51) Int. Cl.
*H04Q 7/00* (2006.01)

(52) U.S. Cl. .................... 370/329; 455/411; 340/426.12

(58) Field of Classification Search ............... 455/404.1, 455/404.2; 340/426.12, 540, 573.1, 539.13; 705/40
See application file for complete search history.

(56) References Cited

U.S. PATENT DOCUMENTS

| 6,262,666 | B1 * | 7/2001 | Lodichand .................. 340/573.1 |
| 2002/0080028 | A1 * | 6/2002 | Edwards ....................... 340/540 |
| 2002/0112183 | A1 | 8/2002 | Baird, III et al. |
| 2003/0034881 | A1 * | 2/2003 | Linnett et al. ............ 340/309.15 |
| 2003/0141977 | A1 | 7/2003 | Brown et al. |
| 2003/0144952 | A1 * | 7/2003 | Brown et al. .................... 705/40 |
| 2003/0169161 | A1 * | 9/2003 | Brown et al. ............. 340/426.12 |
| 2005/0083195 | A1 * | 4/2005 | Pham et al. .............. 340/539.13 |
| 2005/0191988 | A1 * | 9/2005 | Thornton et al. ........... 455/404.1 |

FOREIGN PATENT DOCUMENTS

WO   WO 02/35491 A1   5/2002

OTHER PUBLICATIONS

EPO Examination Report dated Oct. 20, 2006.
Examination report dated Oct. 19, 2007 issued in corresponding Chinese Application No. 200510074194.0.

* cited by examiner

*Primary Examiner* — Phuoc Doan
(74) *Attorney, Agent, or Firm* — Ridout & Maybee LLP (57) ABSTRACT

A wireless communication device (and its related method of operation) includes, if invoked, password protected access to data stored therewithin and/or to normal device operations and further includes duress password checking logic that automatically causes a duress message to be sent if a duress password has been entered. The duress message is preferably sent without maintaining any user accessible indication of such sending. It is also preferred that the password checking logic automatically cause an end-of-duress message to be sent if a normal password is entered after a duress password has been entered. A plurality of different duress passwords may be entered into a duress password portion of data memory in the device.

34 Claims, 6 Drawing Sheets

| Example | Normal Password | DURESS Password(s) |
|---|---|---|
| 1<br>(one DPW) | "MIKE" | WATER |
| 2<br>(plural DPWs) | "MIKE" | WATER<br>FIRE |
| 3<br>(DPW = NPW with predetermined prefix and/or suffix) | "MIKE" | MIKE 1<br>JMIKE<br>MIKE 2<br>JMIKE 2<br>⋮<br>MIKE 32<br>⋮<br>MIKE 47854<br>2JMIKE 478 |
| 4<br>(DPW = NPW with non-predetermined prefix and/or suffix) | "NEIL" | NEIL * * * · · ·<br>* * * · · · NEIL<br>* * · · · NEIL * * * · · · |
| 5<br>(permutation of 1st n and last n digits) | "password" | apsswodr |
| 6<br>(permutation = reverse ordering of digits) | "help" | pleh |
| 7<br>(permutation = n rotations of digits) | "password" | rdpasswo |

*Fig. 6*

DURESS Message Example

| Addressee | PIN | Owner ID | Current Time | Set DURESS flag 1B | Other |
|---|---|---|---|---|---|
| 700 | 702 | 704 | 706 | | |

*Fig. 7*

WIRELESS COMMUNICATION DEVICE WITH DURESS PASSWORD PROTECTION AND RELATED METHOD

BACKGROUND OF THE INVENTION

1. Field of the Invention

This invention generally relates to mobile wireless communication devices having password protection for access to stored data and/or normal device operation.

2. Related Art

Password protection for access to stored data and/or normal device operation is well known for wireless communication devices (e.g., cell phones, mobile email devices, etc.) and other electronic devices or systems (e.g., computers, computer systems, computer service accounts, computer programs, etc).

Home alarm systems are typically also password protected. For example, the alarm is often "armed" and "disarmed" only with use of a secret password supposedly known only to the house owner and authorized guests.

Most home alarms also now include a duress password feature. The duress password is distinguishable in some manner from a normal password (e.g., possibly one character is changed such that if a normal password is 1 2 3 4 5, the duress password might be 1-2-3-4-4). If the homeowner is placed in duress (e.g., by a burglar breaking into the home and threatening bodily harm while demanding that the alarm system be disarmed or turned off), the owner can enter the duress password instead of the normal password. When the alarm system recognizes entry of the duress password, it automatically sends an emergency call to the alarm service (or "911") signaling that immediate assistance is needed at that particular residence. Of course, such duress signaling occurs silently so that the possibly present and observant attacker should not know that it has happened. In effect, this gives the homeowner a silent way to call for help.

Mobile wireless communication devices (e.g., cell phones, portable computers with wireless interfaces, wireless email transceivers and the like) are also sometimes password protected. That is, access to data stored in the mobile wireless communication device and/or normal operation of the device is blocked unless the legitimate user's secret password is entered (assuming that the password protection feature has been invoked by the user). However, such password-protected wireless communication devices have not previously had a duress password feature.

BRIEF SUMMARY OF THE INVENTION

We have now recognized that a duress password feature could be of value in a mobile wireless communication device. For example, the legitimate user of a mobile wireless communication device with password protection might also be placed under duress and effectively forced to enter a password providing an unauthorized person with access to stored data and/or normal operation. If this happens, a duress password feature for such mobile wireless communication device is now provided by this invention. Entry by the user of a duress password would still unlock the mobile wireless communication device—e.g., so that the attacker is not aware that a duress password has been entered. However, whenever a duress password is entered, the mobile wireless communication device would recognize it as such and silently send out a "help" message to an appropriate person or institution.

An exemplary wireless communication device (and its related method of operation) includes, if invoked, password protected access to data stored therewithin and/or to normal device operations and further includes password checking logic which, if invoked, prevents access to certain device data and/or operation and which includes duress password checking logic that automatically causes a duress message to be sent if a duress password has been entered prior to permitting access to certain device data and/or operations.

In the exemplary wireless communication device duress password checking logic causes the duress message to be sent without maintaining any user accessible indication of such sending. It is also preferred that the password checking logic automatically causes an end-of-duress message to be sent if a normal password is entered after a duress password has been entered.

The exemplary wireless communications device/method may further include duress password entry logic which permits user entry of at least one duress password into a duress password portion of data memory in the device. The duress password entry logic may also permit user entry of a plurality of different duress passwords into a duress password portion of data memory in the device.

The exemplary duress password checking logic may compare an entered password to a plurality of pre-stored passwords to determine if any one of such plurality has been entered. For example, it may determine if an entered password constitutes a pre-determined altered version of a normal password to determine if a duress password has been entered. Such pre-determined altered version of a normal password may include a permutation of digits in the normal password. Or, alternatively, the pre-determined altered version of the normal password may simply be the normal password with at least one extra digit pre-pended, and/or appended thereto. Such extra digit(s) may be of pre-determined value(s). The pre-determined value(s) may have been pre-stored by a user in said duress password portion of data memory in the device.

The exemplary duress password checking logic may also determine if an entered password constitutes a pre-determined altered version of a duress password pre-entered by a user into the duress password portion of data memory—as opposed to performing only an automatic algorithmic operation based on the normal password and/or other prior user or factory inputs. Once again, the predetermined altered version of a pre-entered duress password may simply be the pre-entered duress password with at least one extra digit pre-pended and/or appended thereto. The entered extra digit(s) may be of pre-determined value(s). The pre-determined value (s) may have been pre-stored by a user in a duress password portion of data memory in the device.

In the exemplary embodiment to be described below, the user is given an option to set at least one duress password. An option is also provided to delete all duress passwords previously stored so as to permit the user to start over again if some of the duress passwords have been forgotten.

In some embodiments, the storage of more than one duress password is advantageously permitted. With multiple duress passwords a user might be able to keep at least one duress password from even a knowledgeable attacker who might ask not just for the normal password but also a duress password. Even if the knowledgeable attacker might guess that there could be more than one user's password, he would be unlikely to know how many duress passwords might exist. Accordingly, even when the user is under duress by an attacker, the attacker might be pacified by providing only two or more duress passwords which can be freely given to the attacker without exposing the normal password. Accordingly, no matter which of the passwords is used by the attacker, either would be a duress password that would cause a silent "help" message to be transmitted if used.

Although there are possible advantages to storing plural duress passwords, it may also be preferred to store only one duress password since there may be security problems in storing a greater number of duress passwords.

The definition of one or more duress passwords may be accomplished by manual entry of arbitrary digits and/or by algorithmic changes to either the normal password or one or more prototype duress passwords manually entered by the user. A wireless communication device according to this invention includes password checking logic which prevents access to certain device data and/or operation and includes duress password checking logic that automatically causes a duress message to be sent if a duress password has been entered instead of a normal password.

The duress password may be defined in perhaps almost unlimited ways so long as it is essentially just as "strong" as the normal device password. Some examples of ways to determine an appropriate duress password are summarized below:
  combinations of the normal password with other string(s) of digits
    pre-pended (prefix)
    appended (suffix)
  manually entered duress password and variants thereof
    (including its combination with other string(s) of digits (see above)
  permutations of the normal password.

Preferably the silent duress message will be sent to a predetermined (i.e., earlier specified) email addressee to alert that addressee that a particular account/owner/device is under duress. This duress email message is preferably sent without any appearance in the normal message log to help insure that the attacker cannot determine that the device has been placed in the duress mode. The duress message might, for example, contain a PIN (personal identification number), owner information and identity, current time (in some predetermined or specified time zone) and any other desired information. The format of such an email may be hard-coded on the device or otherwise defined by suitable computer program code and user inputs (e.g., in accordance with the owner organization's IT policy—which would likely also specify the email address for duress messages and the like).

In the preferred exemplary embodiment, after a duress password has been entered and a duress message has been sent, the next time a normal password is entered a suitable end of duress message will also be automatically transmitted to the addressee to indicate that the duress mode has ended.

This invention may be embodied in hardware, software or a combination of hardware and software. The invention also provides a method for giving additional password protection in a wireless communication device including password protected access to data and/or normal device operations by automatically causing a duress message to be sent if a duress password has been entered instead of a normal password. The exemplary embodiment is realized at least in part, by executable computer program code which may be embodied in physical program memory media.

BRIEF DESCRIPTION OF THE DRAWINGS

These and other objects and advantages of this invention will be better understood and appreciated in conjunction with the following detailed description of exemplary embodiments taken together with the accompanying drawings, of which.

DETAILED DESCRIPTION OF EXEMPLARY EMBODIMENTS

Figure 1:
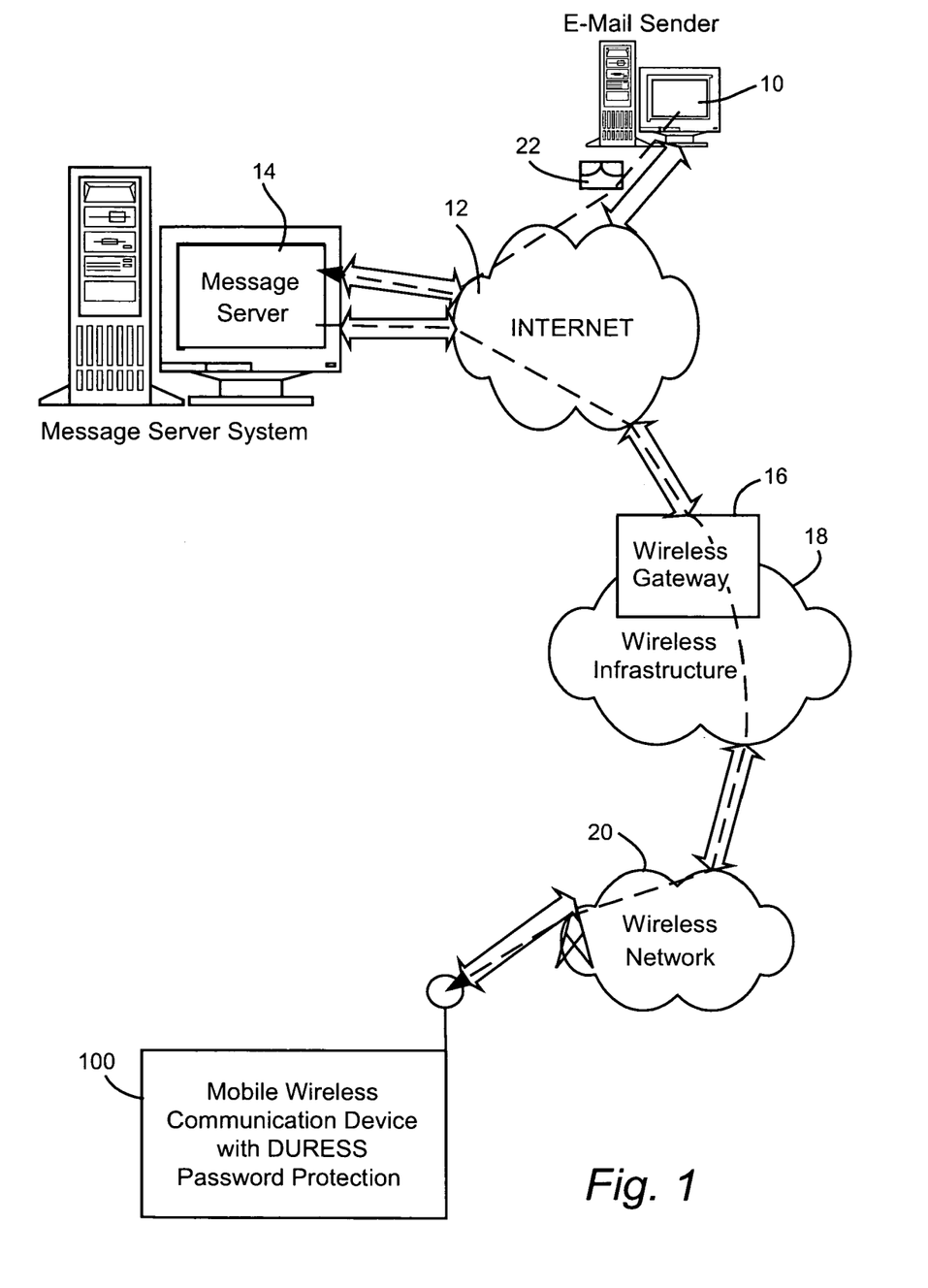
FIG. 1 is an overall system wide schematic view of an exemplary wireless email communication system incorporating a mobile wireless communication device with duress password protection in accordance with one exemplary embodiment of this invention.

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
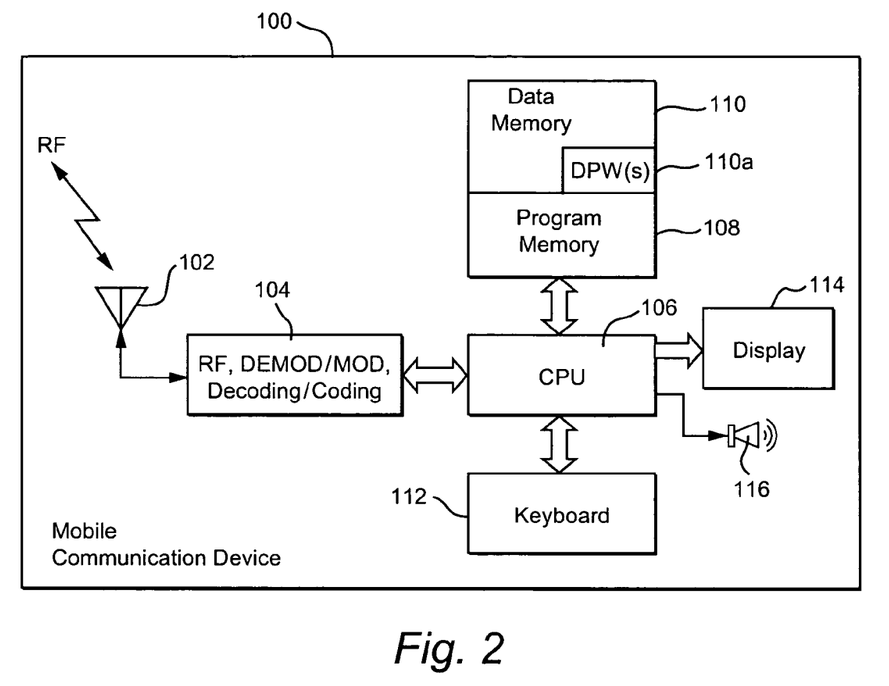
FIG. 2 is an abbreviated schematic diagram of hardware included within an exemplary mobile wireless communication device.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of data memory 110a is available for storing one or more duress password (DPW). Suitable computer program executable code is stored in portions of program memory 108 to constitute the password checking logic and duress password checking logic described below.

Figure 3:
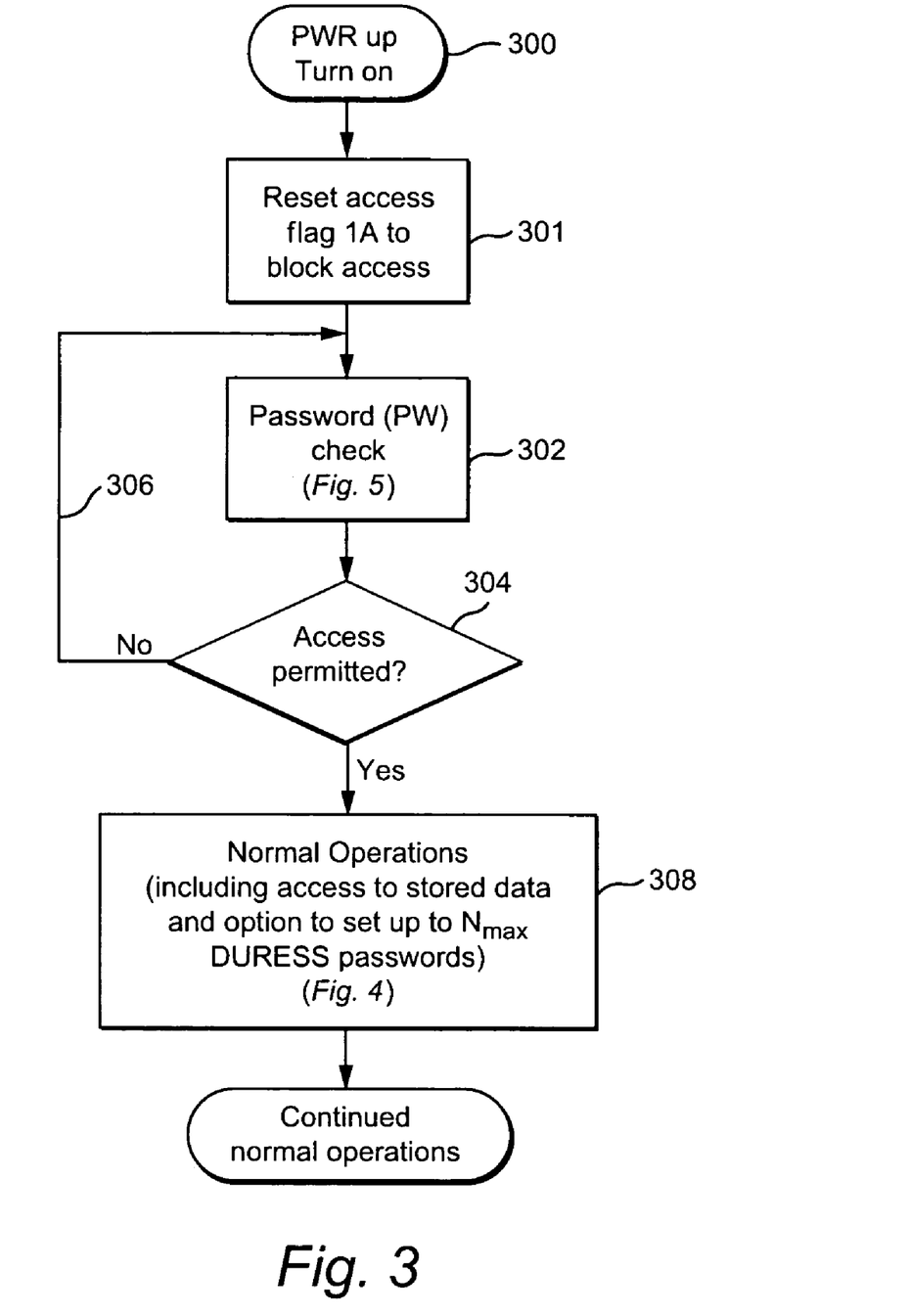
FIG. 3 is an exemplary abbreviated schematic flow diagram of a device control program that may be utilized with the mobile communication device of FIG. 2.

The control CPU 106 will typically be subject to a main control program such as depicted in FIG. 3. Here, upon power up or turn on at 300 if password protection has been invoked access flag 1A is reset at 301 to block access to stored data and normal operation (and possibly also upon concluding other conventional housekeeping chores), control will pass to a password checking logic sub-routine 302. Upon exit from the password checking logic 302, a decision is made at 304 as to whether access is permitted. If not, then a wait loop for password entry is entered via 306. On the other hand, if a suitable password has been entered and access is permitted, then normal operations are entered at 308 (including access to stored data). Among other things, these normal operations in the exemplary embodiment will include an option to set up to $N_{max}$ duress passwords (and $N_{max}$ could even be varied from one device to the next so that an attacker would be less likely to know how many duress passwords might exist).

In a preferred embodiment, the password(s) is(are) stored in the device 100 only as a cryptographically hashed version(s) of the actual password(s). When a password is entered, it is then similarly hashed and compared to the stored hashed password. In the exemplary embodiments described below, use is made of flags that can be "set" and "reset" to denote status information. It will be understood that the presence or absence of a hashed acceptable password in a predetermined data memory field can constitute such a set or reset flag value.

Figure 4:
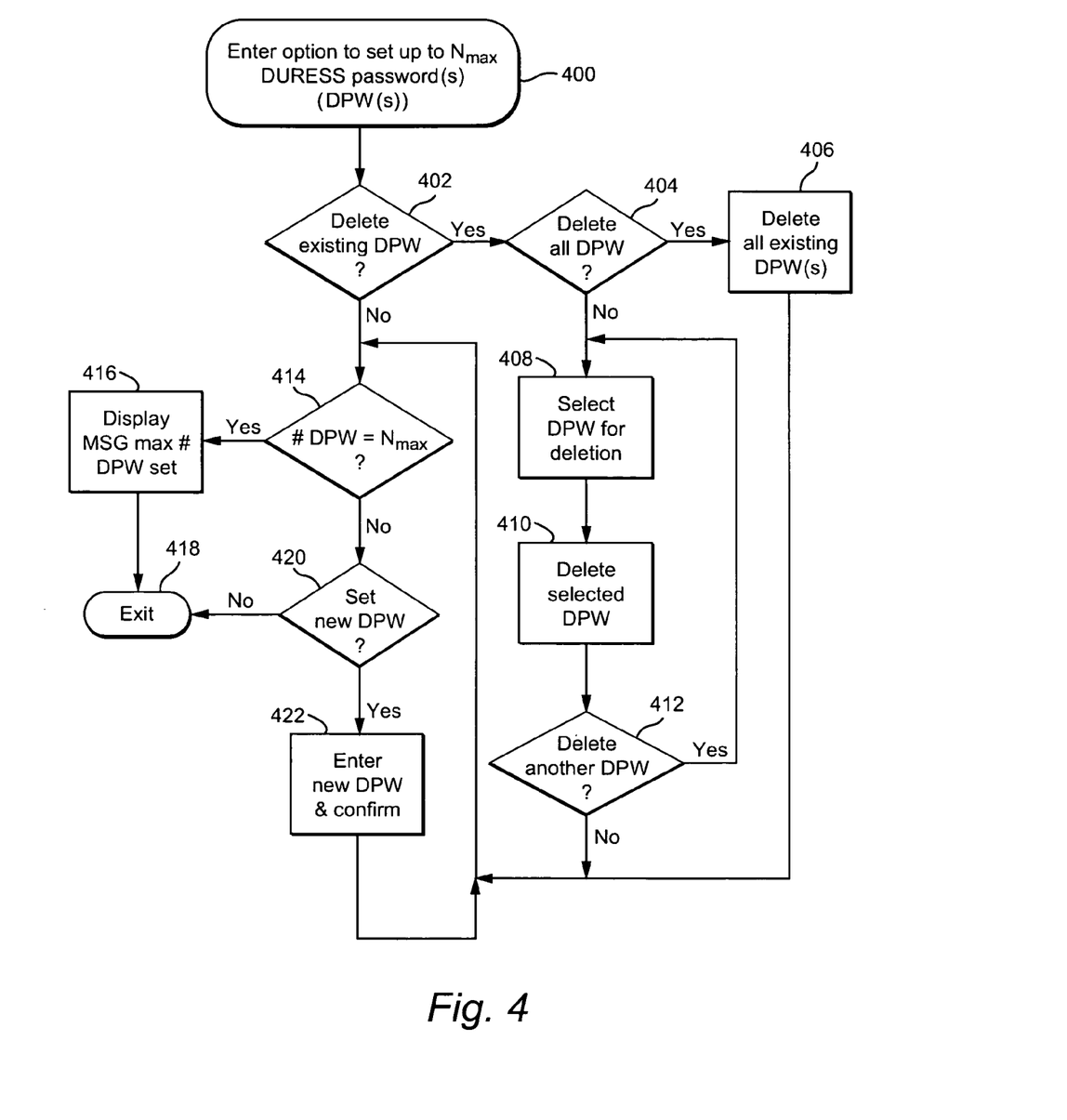
FIG. 4 is an exemplary abbreviated schematic flow chart of computer software (i.e., program logic) that may be utilized in the device of FIG. 2 providing an option to set up to $N_{max}$ duress passwords.

The duress password setting option logic is depicted at FIG. 4 using any desired manually selected menu option procedure. The user is given an option to delete existing duress passwords at 402. If this option is chosen, then the user is also permitted to choose a further option of deleting all previously stored duress passwords at 404. If this option is chosen, then all such existing duress passwords are erased at 406. If the option for deleting all duress passwords is not chosen at 404, then the user is permitted to select a particular duress password for deletion at 408 and that password is then deleted at 410. Thereafter, the user is given another option at 412 to possibly delete yet another previously stored duress password.

After completion of any desired deletion process, the logic checks at 414 to see if the number of stored duress passwords already equals the maximum number $N_{max}$. If so, then a suitable user display message is provided at 416 and the sub-routine is exited at 418. However, if there is still more allocated room in memory to accept duress passwords, then the user is given the option to do so at 420. If that option is selected, then a desired new duress password is manually entered (possibly twice for confirmation) at 422 before control is turned back to the test at 414 for the possible entry of yet another duress password. In this manner, in this exemplary embodiment, the user may manually set up to $N_{max}$ duress passwords (of course $N_{max}$ may be set to one when the mobile communication device 100 is manufactured and distributed to the user).

In this exemplary embodiment, the user is first presented with an option to delete existing passwords and is then presented with an option to add duress passwords. Of course each of these options can be simultaneously presented to the user in a single menu from which any desired option may be directly selected (i.e., without going through multiple sequential optional selections).

Figure 5:
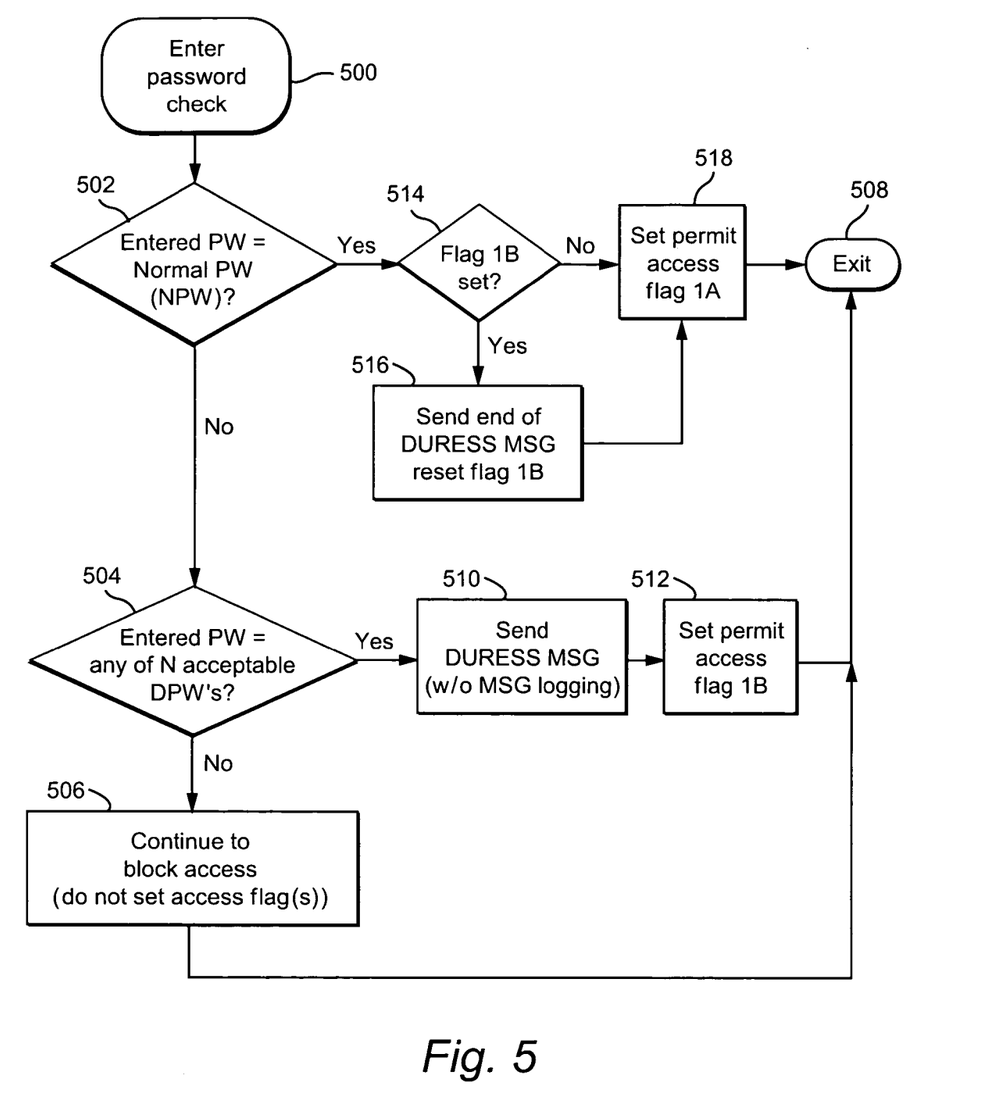
FIG. 5 is an exemplary abbreviated schematic flowchart of computer software (i.e., program logic) that may be utilized in the device of FIG. 2 to provide password checking logic which includes duress password checking logic.

As shown in FIG. 5, the password checking logic is entered at 500 and at 502 a test is made to determine whether an entered password is a normal password (NPW). If it is not, then a further test is made at 504 to see if the entered password equals any of the $N_{max}$ acceptable duress passwords. If not, then access to stored data and normal operations continue to be blocked at 506 and the sub-routine is exited at 508.

If an acceptable duress password is found to be present at 504, then a duress message is sent at 510 to a predetermined (i.e., earlier specified) email addressee to alert that addressee that a particular account/owner/device is under duress. As noted in FIG. 5, this duress message is preferably sent without any normal message logging so as to not provide any user accessible indication that the message has been sent. This is because the attacker might otherwise discover that the device has been set in the duress mode. Nevertheless, in the exemplary embodiment, a special permit access flag 1B is set at 512 which can be used internally (i.e., without any user access) to indicate that the device is in a duress mode.

Although there may be many internal uses of the duress mode flag 1B, one use in the exemplary embodiment is depicted in FIG. 5 if the test at 502 determines that a normal password has been entered. If so, then a test is made at 514 to see if the duress mode flag 1B has been set. If so, then an end of duress message is sent at 516. Furthermore, as also depicted in the logic of FIG. 5, when a normal password has been entered, then whether or not the duress mode flag 1B has been set, the permit access flag 1A (i.e., the normal access flag) is set at 518. Of course, the duress flag 1B is re-set when the end of duress message is sent at 516.

The duress mode flag 1B is also used to allow or disallow access to duress password configuration options, for instance the duress password setting option. If the duress mode flag 1B is set, then access to the duress password configuration options is disallowed. This prevents the attacker from determining the number of duress passwords set or the manner in which the duress passwords are defined. If the duress mode flag 1B has not been set, then access to the duress password configuration options is allowed.

In some implementations, the duress mode flag 1B may not be present. If an acceptable duress password is entered at 504, then a duress message is sent at 510 without setting the duress mode flag 1B in 512. Since the duress mode flag 1B is not being used, the test at 514 is not performed, and the end of duress message is not sent at 516.

Figure 7:
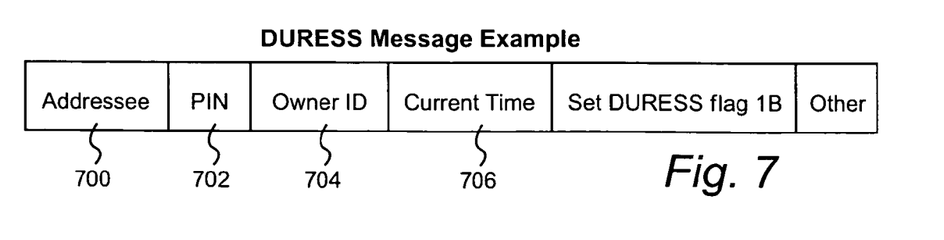
FIG. 7 depicts one example of a duress message format that may be used in accordance with this invention.

One example of a duress message is depicted in FIG. 7. The addressee field 700 could be pre-set by the user or by the user's organization (e.g., as part of an organization's defined IT Policy rules downloaded from a server or otherwise entered in device 100 during the set up and issuance of the mobile communication device 100 by an organization to its employees). The addressee should, of course, be an individual or organization that is intended to monitor incoming email messages for duress messages—and ready to take appropriate action in the case of message is received. The duress message may also include a PIN 702 (personal identification number), an owner identification 704, the time at which the duress message was sent 706, the set duress flag 1B (to indicate that this is a duress message rather than an end of duress message) and any other information that might be desired by a particular user or user organization. An end of duress message may have a similar format and content except that it would include the re-set value of the duress flag 1B rather than the set value so as to indicate the end of prior period of duress.

Figure 6:
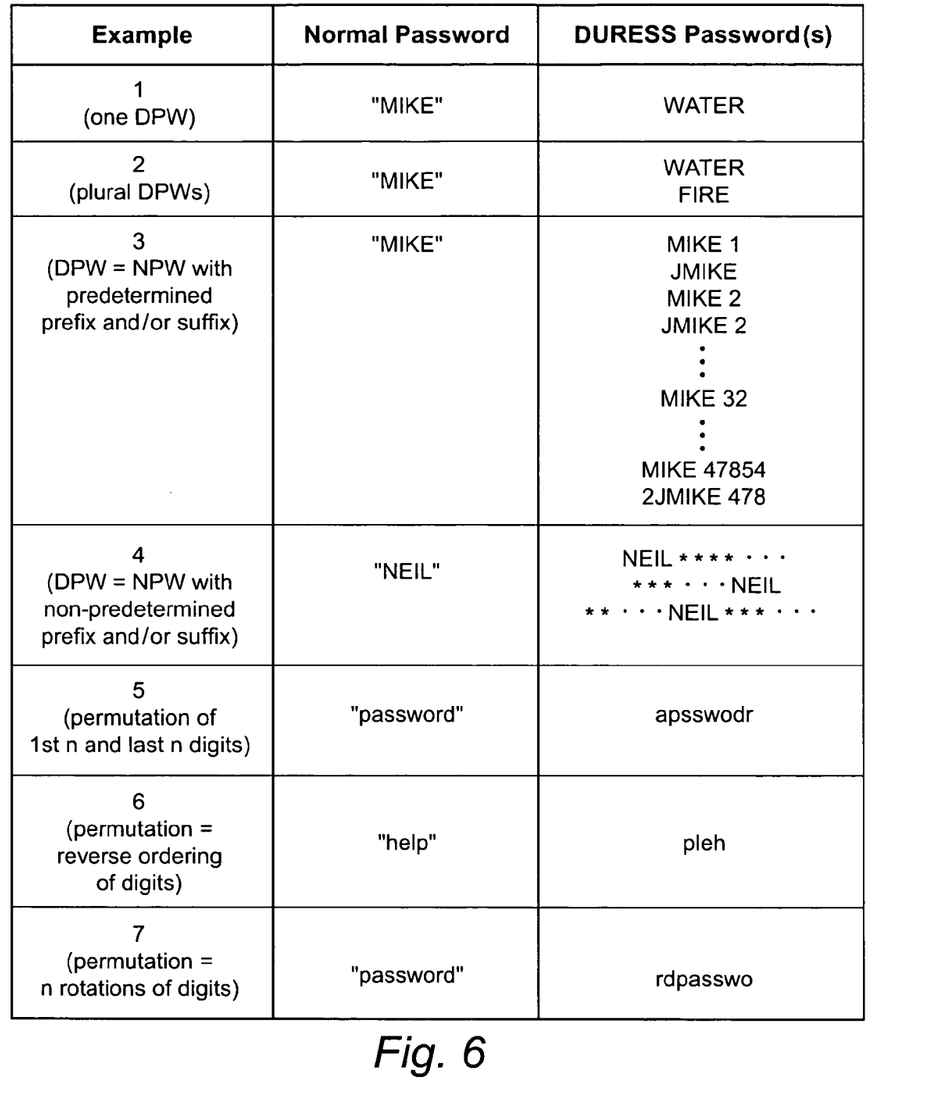
FIG. 6 depicts a few exemplary ways in which duress passwords may be determined algorithmically (e.g., based upon user entered normal and/or duress passwords) or manually.

FIG. 6 provides a few examples of suitable ways to define duress passwords. The simplest Example 1 uses a single DPW that is manually entered by the user as desired. For example, if the normal password is "Mike", the duress password could be any totally unrelated string of characters such as "water".

The second example in FIG. 6 depicts a simple manually-entered plurality of duress passwords where the user can enter any desired arbitrary strings as duress passwords (e.g., "water" and "fire").

The third example depicted in FIG. 6 defines a duress password as the normal password with appended and/or prepended digits. This definition of a duress password could be algorithmically automatically determined by suitable logic or, alternatively, could involve manual input by the user of desired particular prefixes and/or suffixes.

The fourth example in FIG. 6 simply defines a duress password as a normal password with any additional character (i.e., in effect a "wild card") as a suffix or prefix (or both prefix and suffix).

The fifth example in FIG. 6 defines the duress password as a permutation of the first and last n digits of the normal password. For example, if the normal password is "password", and n equals 2 then the duress password could be "APSSWODR". Throughout this description, it should be understood that the value of a "digit" may have any acceptable usable alphabetic, numeric, symbolic, or other place-value.

The sixth example in FIG. 6 defines the duress password as the reverse order permutation of the normal password digits. Another exemplary permutation of the normal password to define the duress password is depicted as Example 7 in FIG. 6 where the digits of the normal password have been rotated n times (n=2 in the example shown in FIG. 6).

In an exemplary embodiment as applied to the wireless communications device 100, there could be an option (under an options screen off an application list) to set a duress password. The user could have as many duress passwords as $N_{max}$. To enter a new duress password, the user manually enters it (and then could be asked to confirm it). There can also be an option to delete ALL duress passwords. This would allow the user to start fresh if some duress passwords are forgotten.

One reason that a user might want more than one duress password to is to try and prevent a knowledgeable attacker from, instead of just asking for the normal password, asking for the normal password and the duress password. If there is just one duress password, then the attacker has a 50% chance to guess which is the normal one. Since there is no theoretical limit on the number of duress passwords that a user might have, the attacker doesn't know how many to ask for. If the attacker asks for the normal password and the duress password, the user may have two duress passwords which can be given to the attacker and thus not expose the real password.

In some implementations it may be best to allow one duress password to start with. N-duress passwords help to stop a knowledgeable attacker but there may be problems with securely storing numerous passwords.

Another way to define a duress password is to just accept combinations of the normal password with some other string. For example, if a normal password is "mike" then duress passwords could be "mike" followed by some digits. So "mike1", "mike2", "mike32", "mike47854", etc. would all be accepted as duress passwords. These extra digits (though not limited to digits but useful as illustration) could just be a suffix, or a prefix, or both.

As another variant, a duress password could be set to equal some string and then the device would accept that string or variants of that string as duress passwords. So if a duress password is "neil", the device would accept, for the duress password, "neil", "neil1", "neil123", etc.

A permutation of the normal password may also be used as the duress password. Some examples are:
  a. permute the first n characters and/or the last n characters (so password=>apsswodr if the first and last two characters are permuted). One should watch out for passwords like "hhelpp".
  b. type the password in backwards (so help=>pleh). Here one must watch out for palindromes.
  c. rotate the characters some number of times (so if they are rotated twice then password=>rdpasswo). Here one must watch out for passwords that are all of the same digit value.
  d. Other types of permutation may also be acceptable.

These are just examples that that have been considered. It is important, though, that the duress password be just as "strong" as the device password. Otherwise an attacker could just guess the duress password and have access to the device. A duress notification may have been sent but the attacker would still have access to the information on the device.

Once the duress password has been setup, it may be used. If someone enters one of the duress passwords into the lock screen, the device will then silently send an email to a specified email account, alerting whomever monitors that account that the device is under duress. This email that would be sent would not appear in the message list (otherwise the attacker may know that the device is in duress mode).

The email would contain identification information about the device: the PIN, owner information if present, current time (whether in local time or converted to GMT), and any other needed information. The email format would either be hard-coded on the device or set by IT Policy. The email address for it to be sent to, could be specified also by IT Policy.

Whenever the duress password is entered into a password entry screen, this email would be sent. Also, the first time the normal password is entered after the device has been in duress mode, a notification email will be sent (to indicate duress mode is over).

While the invention has been described in connection with what is presently considered to be the most practical and preferred exemplary embodiments, it is to be understood that the invention is not to be limited to the disclosed embodiments, but, on the contrary, is intended to cover all variations, modifications and equivalent arrangements included within the spirit and scope of the appended claims.

What is claimed is:

1. A wireless communications device comprising:
  means for testing a first user-entered password to determine whether a duress password has been entered, said means for testing including means for comparing said first user-entered password to a plurality of pre-stored duress passwords to determine if any one of such plurality has been entered;
  means for automatically sending a duress message responsive to determining that a duress password has been entered;
  means for testing a subsequent user-entered password to determine whether a normal password has been entered; and
  means for automatically causing an end-of-duress message to be sent responsive to determining that the normal password has been entered subsequent to said determining that said duress password had been entered.

2. A wireless communications device as in claim 1 wherein the wireless communications device is a hand-portable, mobile wireless communications device having a display and a keypad.

3. A wireless communications device as in claim 1, wherein the wireless communications device is a hand-held, mobile wireless communications device.

4. A wireless communications device as in claim 1 wherein the means for automatically sending the duress message sends the duress message as an email message.

5. A wireless communications device including password protected access to data stored therewithin and/or to normal device operations, said device comprising:
  password checking logic:
    which prevents access to certain device data and/or operation;
    which includes duress password checking logic that:
      compares an entered password to a plurality of pre-stored duress passwords to determine if any one of such plurality has been entered;
      automatically causes a duress message to be sent responsive to determining that a duress password has been entered instead of a normal password, and
      which automatically causes an end-of-duress message to be sent responsive to determining that said normal password has been entered after said duress password had been entered.

6. A wireless communications device as in claim 5 wherein said duress password checking logic causes said duress message to be sent without maintaining any user accessible indication of such sending.

7. A wireless communications device as in claim 5 further comprising:
  duress password entry logic which permits user entry of at least one duress password into a duress password store.

8. A wireless communications device as in claim 7 wherein said duress password entry logic permits user entry of a plurality of different duress passwords into said duress password store.

9. A wireless communications device as in claim 7 wherein said duress password checking logic determines if an entered password constitutes a pre determined altered version of a duress password pre-entered by a user into the duress password store.

10. A wireless communications device as in claim 9 wherein said predetermined altered version of a pre-entered duress password comprises the pre entered duress password with at least one extra place-value pre-pended and/or appended thereto.

11. A wireless communications device as in claim 10 wherein said extra place-value(s) is(are) of pre-determined value(s).

12. A wireless communications device as in claim 11 wherein said pre-determined value(s) has (have) been pre-stored by a user in said duress password store.

13. A wireless communications device as in claim 5 wherein said duress password checking logic determines if an entered password constitutes a pre-determined altered version of said normal password to determine if a duress password has been entered.

14. A wireless communications device as in claim 13 wherein said pre-determined altered version of said normal password comprises said normal password with at least one extra place-value pre-pended and/or appended thereto.

15. A wireless communications device as in claim 14 wherein said extra place-value(s) is(are) of pre-determined value(s).

16. A wireless communications device as in claim 15 wherein said pre-determined value(s) have been pre-stored by a user in said duress password store.

17. A wireless communications device as in claim 5, wherein the wireless communications device is a hand-portable, mobile wireless communications device.

18. A wireless communications device as in claim 5, wherein the wireless communications device is a hand-held, mobile wireless communications device.

19. A wireless communications device as in claim 5, wherein the duress password checking logic automatically causes the duress message to be sent as an email message.

20. A wireless communications device including password protected access to data stored therewithin and/or to normal device operations, said device comprising:
    password checking logic
        which prevents access to certain device data and/or operation;
        which includes duress password checking logic that automatically causes a duress message to be sent responsive to determining that an entered password equals one of a plurality of pre-stored duress passwords, where at least one duress password of said plurality of pre-stored duress password is a pre-determined altered version of a normal password where said pre-determined altered version of said normal password comprises a permutation of place-values in said normal password; and
        which automatically causes an end-of-duress message to be sent responsive to determining that said normal password has been entered after said duress password had been entered.

21. A method for providing additional password protection in a wireless communications device including password protected access to stored data and/or to normal device operations, said method comprising:
    determining that a duress password has been entered instead of a normal password by comparing an entered password to a plurality of pre-stored duress passwords to determine if any one of said plurality has been entered;
    automatically causing said wireless communications device to transmit a duress message responsive to said determining that a duress password has been entered instead of a normal password, and
    automatically causing said wireless communications device to transmit an end-of-duress message responsive to determining that said normal password has been entered after said duress password had been entered.

22. A method as in claim 21 wherein said duress message is sent without maintaining any user accessible indication of such sending.

23. A method as in claim 21 further comprising:
    permitting user entry of at least one duress password into a duress password store.

24. A method as in claim 23 wherein said permitting step permits user entry of a plurality of different duress passwords into said duress password store.

25. A method as in claim 23 wherein a pre-determined altered version of a pre-entered duress password constitutes a duress password.

26. A method as in claim 25 wherein said predetermined altered version of a pre-entered duress password comprises the pre-entered duress password with at least one extra place-value pre-pended and/or appended thereto.

27. A method as in claim 26 wherein said extra place-value(s) is(are) of pre-determined value(s).

28. A method as in claim 27 wherein said pre-determined value(s) has (have) been pre-stored by a user in said duress password store.

29. A method as in claim 21 wherein a pre-determined altered version of said normal password constitutes a duress password.

30. A method as in claim 29 wherein said pre-determined altered version of said normal password comprises a permutation of digits in said normal password.

31. A method as in claim 29 wherein said pre-determined altered version of said normal password comprises the normal password with at least one extra place-value pre-pended and/or appended thereto.

32. A method as in claim 31 wherein said extra place-value(s) is(are) of pre-determined value(s).

33. A method as in claim 32 wherein said pre-determined value(s) has (have) been pre-stored by a user in said duress password store.

34. A method as in claim 21, wherein the duress message is an email message.

* * * * *